United States Patent
Lopez

(10) Patent No.: US 8,355,160 B2
(45) Date of Patent: Jan. 15, 2013

(54) DETECTION OF ROLLER ECCENTRICITY IN A SCANNER

(75) Inventor: Miguel Angel Lopez, Terrassa Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 400 days.

(21) Appl. No.: 12/843,514

(22) Filed: Jul. 26, 2010

(65) Prior Publication Data
US 2012/0019870 A1    Jan. 26, 2012

(51) Int. Cl.
*H04N 1/028* (2006.01)
*H04N 1/047* (2006.01)
*H04N 1/48* (2006.01)
*H04N 1/56* (2006.01)
*H04N 1/12* (2006.01)
*H04N 1/409* (2006.01)
*H04N 1/58* (2006.01)

(52) U.S. Cl. ........ 358/1.6; 358/3.26; 358/505; 358/406; 358/474; 358/478; 358/496

(58) Field of Classification Search .......... 358/1.6, 358/1.9, 3.24, 3.26, 504, 505, 518, 521, 406, 358/463, 471, 474, 477, 478, 493, 494, 496–498
See application file for complete search history.

(56) References Cited

U.S. PATENT DOCUMENTS
7,385,735 B2 * 6/2008 Makino et al. ............... 358/474
8,098,411 B2 * 1/2012 Iwago et al. ................. 358/474

* cited by examiner

Primary Examiner — Scott A Rogers
(74) Attorney, Agent, or Firm — Steven L. Webb

(57) ABSTRACT

A method and apparatus for detecting roller eccentricity in a CIS scanner is disclosed. An image of a target is captured using the CIS scanner. The image of the target is analyzed for periodic horizontal banding. The period of the periodic horizontal banding is compared with the circumference of a pressure roller in the CIS scanner. When the period matches with the circumference of the pressure roller, an error is set.

15 Claims, 2 Drawing Sheets

DETECTION OF ROLLER ECCENTRICITY IN A SCANNER

BACKGROUND

Large format sheet feed scanners may use contact image sensors (CIS) to create an image of the document being scanned. In a CIS scanner, pressure rollers are used to hold the document against the sensor. Because the CIS has a very narrow depth of field, any gap between the document and the top surface of the cover glass on the CIS may cause problems in the image of the scanned document. When the pressure rollers are not properly aligned, the pressure rollers may exert uneven amounts of pressure against the document as the document travels through the scanner.

For example, when one of the pressure rollers inside a CIS scanner is not perfectly cylindrical, an image quality (IQ) defect called "horizontal periodical banding" (HPB) may be produced in the image. This defect in the image is caused by the different pressure that the roller applies against the original document as it is being moved through the scanner. Since the roller is not perfectly cylindrical, but the rotational axis of the roller is fixed, the effective radius of the pressure roller varies (this condition is sometimes called pressure roller eccentricity), and so does the pressure applied against the scanned paper. This variation in pressure may cause the distance between the scanned paper and the glass plate on the top of the sensor to vary. The variation in distance causes small differences in the focus of the image and may cause small shifts in the color and/or intensity of the image.

In another example, the roller may be cylindrical, but the cylindrical surface of the roller may not be aligned with the axis of rotation of the roller. This will also cause a variation in the effective radius of the roller and cause a periodic variation in the pressure applied by the roller. In some cases the pressure applied by the roller may vary enough to cause the document to become separated from the top surface of the sensor. The change in distance between the document and the sensor may cause a periodic change is focus and a periodic shift in the color and/or the intensity of the image.

DETAILED DESCRIPTION

FIGS. 1-4, and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
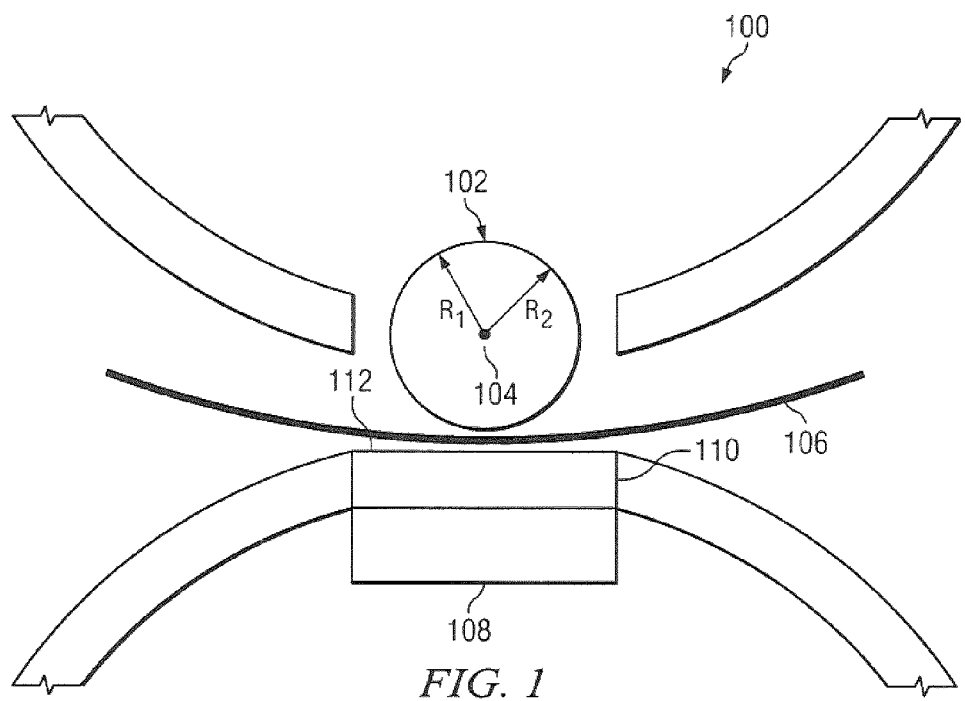
FIG. 1 is a sectional view of a CIS scanner 100 in an example embodiment of the invention.

FIG. 1 is a sectional view of a CIS scanner 100 in an example embodiment of the invention. CIS scanner 100 comprises pressure roller 102 and contact image sensor 108. Contact image sensor 108 is covered by glass plate 110. In operation, pressure roller 102 forces the document 106 being scanned against the top face 112 of glass plate 110. Pressure roller 102 rotates about axis 104. When pressure roller is non-cylindrical, or when the axis formed by the cylindrical surface of pressure roller 102 does not coincide with the axis of rotation 104, radius R1 may not be the same as radius R2. When R1 is not equal to R2 the pressure exerted by pressure roller 102 against document 106 will vary periodically, with the period equal to the circumference of pressure roller 102.

The periodic variation in pressure may cause a gap to form periodically between the document 106 being scanned and the top surface 112 of the glass plate 110. The gap may cause a periodic shift in the color of the image produced by scanner 100 and/or a periodic changing in the intensity of the image produced by the scanner. The periodic shift in color and/or intensity may result in horizontal periodic banding in the image. The horizontal periodic banding may be more detectable in areas of the original that contain patches of the same color, for example a patch of solid red or solid green.

Figure 2:
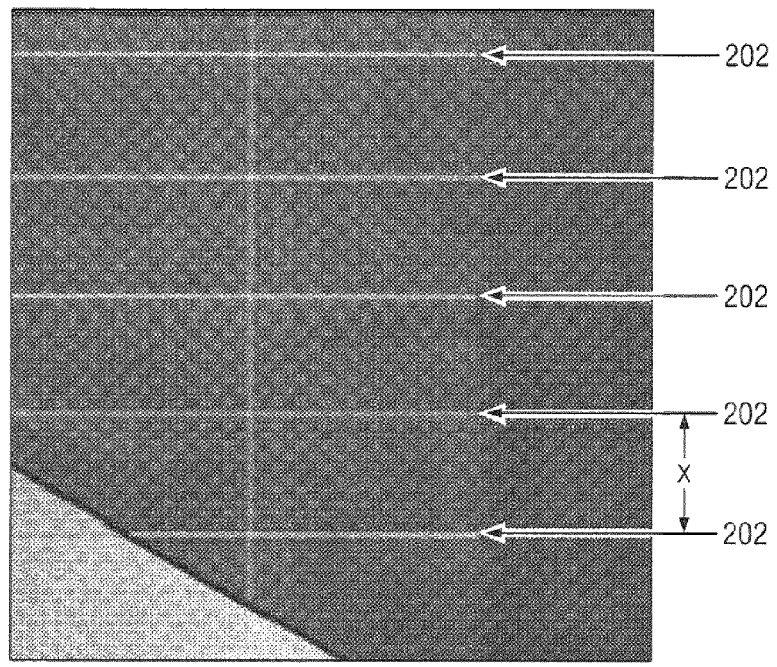
FIG. 2 is segment of an image scanned using a CIS scanner in an example embodiment of the invention.

FIG. 2 is segment of an image scanned using a CIS scanner in an example embodiment of the invention. Horizontal periodical banding (HPB) can be seen at arrows 202. The spacing between the horizontal bands is x, which is equal to the circumference or perimeter of the pressure roller. In some example embodiments of the invention, the pressure roller has a circumference of 5.5 cm. To produce at least two horizontal bands in the scanned image, the length of the original image should be at least 1.6 times the circumference of the pressure roller. In some embodiments of the invention, the length of the target image is at least three times the circumference of the pressure roller.

In large scale CIS scanners, multiple CIS's are typically used to scan the large paper widths required. Each CIS may not be very wide, for example 20 cm wide, but stacked together they can scan page widths of multiple meters. Typically each CIS will have its own pressure roller. In some example embodiments of the invention, the target image may be sized such that it fills the width of only a single contact image sensor to be tested. In other example embodiments, the target image may be wide enough to test multiple contact image sensors and their corresponding pressure rollers with a single scan. When the target image is the full width of the scanner, all the contact image sensors and their corresponding pressure rollers may be tested with a single scan.

The target image can be any color, or even a greyscale shade. However solid colors and solid greyscale tones or shades may show the horizontal banding more clearly. When doing the analysis to determine if the scanned image has HPB, the color image can be used, or a greyscale version of the image may be used. Using the greyscale image reduces the data by a factor of three and may allow a faster processing time.

Most scanners today are color scanners. Color scanners typically use three color channels to scan an image, typically a red channel, a green channel and a blue channel (RGB). Color scanners can produce grayscale images. Typically a color scanner will produce a greyscale image either by scanning with just one color channel (typically the green channel) or by mixing the colors together to produce a greyscale scan. The colors may be mixed using different ratios of the three color channels, for example NTSC. Another way to convert to a grayscale image is to convert from one color space to a second color space that has a luminance or intensity channel. The luminance or intensity channel can be used as the greyscale image. For example, the image scanned by a color scanner with the three RGB color channels will produce an image in RGB color space. L*a*b* color space is another type of color space that has one channel, the L channel, that corresponds to luminance or intensity of the image. Converting the RGB image into the L*a*b* color space, and then using the L channel for the image produces a grayscale image.

The scanned image can be tested for HPB using a number of techniques. In one example embodiment of the invention, one or more columns in the scanned image can be searched for edges using an edge detection algorithm. When using multiple columns, the edges detected should be correlated to determine if the edges line up in the same rows of the image. The distance between edges can be measured and compared with the circumference of the pressure rollers. When the distance between edges in the scanned image matches the circumference of the pressure rollers, HPB is present in the image. Due to tolerance in manufacturing, as well as wear during use, the period between the edges in the image may not exactly match the original circumference of the pressure rollers. When HPB is detected, an error condition can be set, the user can be notified, or a service call can be automatically sent to the scanner manufacturer.

In another example embodiment of the invention, the average value for each row in the target image is determined. The resulting signal may be passed through a filter to reduce noise. A peak detection algorithm is used to determine any peaks in the signal. The distance between peaks is measured and compared to the pressure roller circumference. When the distance between peaks in the signal matches the circumference of the pressure rollers, HPB is present in the image. Due to tolerance in manufacturing, as well as wear during use, the period between the peaks in the image may not exactly match the original circumference of the pressure rollers. When HPB is detected, an error condition can be set, the user can be notified, or a service call can be automatically sent to the scanner manufacturer.

In another example embodiment of the invention, the 2D scanned image can be analyzed using a Fourier transform technique. The Fourier transform technique may also be used with the average value for each row in the target image, or the signal from one or more of the columns from the scanned image. The Fourier transform will give the periodicity that can be compared against the known pressure roller dimensions. When HPB is detected, an error condition can be set, the user can be notified, or a service call can be automatically sent to the scanner manufacturer.

Figure 3:
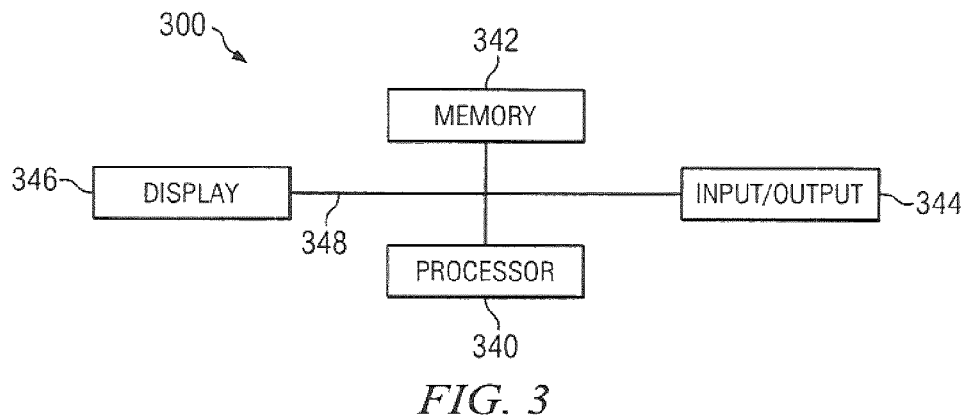
FIG. 3 is a block diagram of a computer 300 in an example embodiment of the invention.

In one embodiment of the invention, the scanner may be configured to analyze scanned images to detect HPB. In other example embodiments, the scanned images may be analyzed for HPB in a computed that has a copy of the scanned image. FIG. 3 is a block diagram of a computer 300 in various embodiments that may be implemented. Computer 300 comprises processor 340, memory 342, I/O device 344, and display 346. Processor 340, memory 342, I/O device 344, and display 346 are coupled together with bus or fabric 348. Computer 300 may be a standalone device, for example a PC, or may be integrated as part of a scanner. In some embodiments, processor 340 may be replaced with an application specific integrated circuit (ASIC).

In operation, a scanned image may be loaded into memory 342. Processor 340 is configured to run code that analyzes the scanned image. When horizontal banding is detected in the image, the period of the horizontal banding will be compared with the pressure roller circumference. When the period of the horizontal banding matches the pressure roller circumference, then PHB has been detected. When HPB is detected, an error condition can be set, the user can be notified, or a service call can be automatically sent to the scanner manufacturer. An error condition can be set in memory 342. The user can be notified using display 346. A service call can be sent using I/O device 344 when computer 300 is coupled to a phone line or a network.

Figure 4:
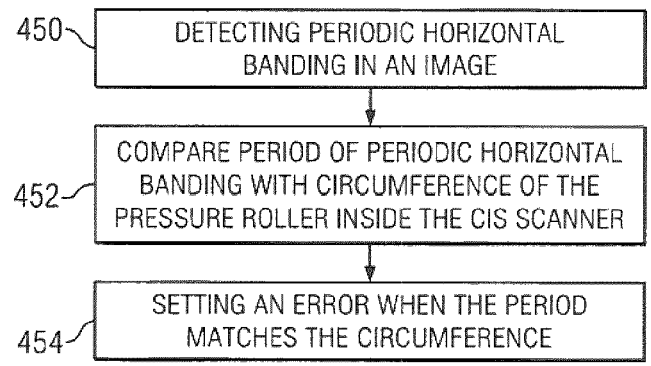
FIG. 4 is a flow chart for depicting a method for detecting pressure roller eccentricity.

FIG. 4 is a flow chart for depicting a method for detecting pressure roller eccentricity. At step 450 an image scanned with a CIS scanner is analyzed for horizontal banding. At step 452 the period of the periodic horizontal banding is compared with the pressure roller circumference. At step 454, an error condition is set when the period of the periodic horizontal banding matches with the pressure roller circumference.

What is claimed is:

1. A method for detecting roller eccentricity, comprising:
    detecting a periodic horizontal banding in the image of the target where the image of the target was captured with a contact image sensor (CIS) scanner;
    comparing a period of the periodic horizontal banding with a circumference of a pressure roller in the CIS scanner;
    setting an error condition when the period of the periodic horizontal banding matches with the circumference of the pressure roller.

2. The method for detecting roller eccentricity of claim 1, wherein the target has a length along a scanning direction at least three times the circumference of the pressure roller.

3. The method for detecting roller eccentricity of claim 1, wherein the image of the target is a grayscale image.

4. The method for detecting roller eccentricity of claim 3, wherein the grayscale image is created by scanning with only a green channel.

5. The method for detecting roller eccentricity of claim 3, wherein the grayscale image is created by converting an RGB scanned image into L*a*b* space and using the L channel as the grayscale image.

6. The method for detecting roller eccentricity of claim 1, wherein the target has a color selected from the group: red, green, grey.

7. The method for detecting roller eccentricity of claim 1, wherein detecting a periodic horizontal banding in the image of the target comprises:
    determining a average value for each row in the image of the target;
    detecting peaks in the average values;
    measuring the distance between peaks.

8. A device, comprising:
    a memory to hold a scanned image of a target, the target having been scanned using a contact image sensor (CIS) scanner;
    a processor to:
    analyze the scanned image and detect periodic horizontal banding (PHB);
    compare a period of the periodic horizontal banding with a circumference of a pressure roller in the CIS scanner; and
    set an error when the period of the periodic horizontal banding matches with the circumference of the pressure roller.

9. The device of claim 8, wherein the device is the CIS scanner.

10. The device of claim 8, wherein the target has a color selected from the group: red, green, grey.

11. The device of claim 8, wherein the stored image is a grayscale image.

12. The device of claim 8, wherein the target has a length at least three times the circumference of the pressure roller.

13. The device of claim 8, wherein the target has a width equal to a maximum scanning width of the CIS scanner, and wherein multiple pressure rollers are checked for PHB using the scanned image of the target.

14. The device of claim 8, wherein the processor is a process to analyze for PHB using a Fourier transform technique.

15. A scanner, comprising:
   a plurality of contact image sensors (CIS) wherein each of the plurality of contact image sensors has a corresponding pressure roller;
   a memory to store an image of a target captured using the plurality of CISs;
   a means for analyzing the stored image for periodic horizontal banding (PHB);
   a means for comparing a period of the PHB with a circumference of at least one of the plurality of pressure rollers;
   a means for communicating an error when the period of the PHB matches the circumference of at least one of the plurality of pressure rollers.

* * * * *